(12) United States Patent  (10) Patent No.: US 8,194,047 B2
Hsieh et al.  (45) Date of Patent: Jun. 5, 2012

(54) MULTI-CHANNEL TOUCH PANEL

(75) Inventors: Ming-Lun Hsieh, Hsinchu (TW);
Jian-Shen Yu, Hsinchu (TW); Chun-Ku Kuo, Hsinchu (TW); Po-Yuan Liu, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 460 days.

(21) Appl. No.: 12/619,149

(22) Filed: Nov. 16, 2009

(65) Prior Publication Data

US 2011/0115718 A1    May 19, 2011

(51) Int. Cl.
*G06F 3/041* (2006.01)
(52) U.S. Cl. ...................................... 345/173
(58) Field of Classification Search .................. None
See application file for complete search history.

(56) References Cited

U.S. PATENT DOCUMENTS

| | | | |
|---|---|---|---|
| 7,821,502 B2 * | 10/2010 | Hristov | 345/173 |
| 2007/0063876 A1 | 3/2007 | Wong | |
| 2008/0150906 A1 | 6/2008 | Grivna | |
| 2008/0218487 A1 | 9/2008 | Huang et al. | |
| 2009/0084613 A1 | 4/2009 | Yang et al. | |
| 2009/0085891 A1 | 4/2009 | Yang et al. | |
| 2009/0194344 A1 | 8/2009 | Harley et al. | |

* cited by examiner

*Primary Examiner* — Jason Olson
(74) *Attorney, Agent, or Firm* — Morris Manning & Martin LLP; Tim Tingkang Xia, Esq.

(57) ABSTRACT

The present invention relates to a multi-channel touch panel. In one embodiment, the multi-channel touch panel includes a plurality of driving electrodes spatial-separately arranged in the form of a matrix, a plurality of sensing electrodes associated with the plurality of driving electrodes such that each sensing electrode is surrounded by a corresponding driving electrode, N driving lines spatial-separately arranged along a row direction and M pairs of sensing lines spatial-separately arranged crossing over the N driving lines along a column direction, where each driving electrode in the row of the electrode matrix is electrically connected to each other by a corresponding driving line, and each odd sensing electrode in a column of the electrode matrix is electrically connected to each other by a first sensing line of the corresponding paired sensing lines, and each even sensing electrode in the column of the electrode matrix is electrically connected to each other by a second sensing line of the corresponding paired sensing lines.

18 Claims, 12 Drawing Sheets

MULTI-CHANNEL TOUCH PANEL

FIELD OF THE INVENTION

The present invention relates generally to a touch panel, and more particularly to a touch panel that utilizes multi-channel driving and multi-channel sensing to reduce RC loading of driving electrodes and/or sensing electrodes.

BACKGROUND OF THE INVENTION

Touch sensing technology capable of providing a natural interface between an electronic system and user has found widespread applications in a variety of fields, for example, in mobile phones, personal digital assistants (PDAs), automatic teller machines (ATMs), game machines, medical devices, liquid crystal display (LCD) devices, light emitting diode (LED) devices, plasma display panel (PDP) devices, computing devices, and the like, where a user may input desired information and/or operate the electronic system through a touch sensing device associated with the electronic system. A touch sensing device typically includes a controller, a sensing circuit having a plurality of touch sensors and a network of control lines electrically connecting the plurality of touch sensors to the controller, and a touch panel associated with the plurality of touch sensors.

There are different types of touch sensing devices available for detection of a touch location. One is a resistive-type touch sensing device that includes two layers of transparent conductive material, such as a transparent conductive oxide, separated by a gap. When touched with sufficient force, one of the conductive layers flexes to make contact with the other conductive layer. The location of the contact point is detectable by a controller that senses the change in resistance at the contact point. In response, the controller performs a function, if any, associated with the contact point.

Another one is a capacitive-type touch sensing device. The capacitive-type touch sensing device can be classified into two types: an analog capacitive sensing device, which uses a contiguous resistive layer, and a projected capacitive sensing device, which uses patterned conductive layers (electrodes).

In a projected capacitive touch device, the touch sensor employs a series of patterned electrodes that are driven with a signal from a controller. Similarly, a location of the contact point can be derived from currents flowing through one or more corresponding electrodes toward the touch point responsive to the touch with sensing the capacitance induced by a user's finger. A finger touch to the sensor provides a capacitive couple from the conductive layer to the body. The location of the contact point is detectable by a controller that measures a change in a capacitively coupled electrical signal at the touch location. Accordingly, the controller performs a function, if any, associated with the touch location.

Figure 11:
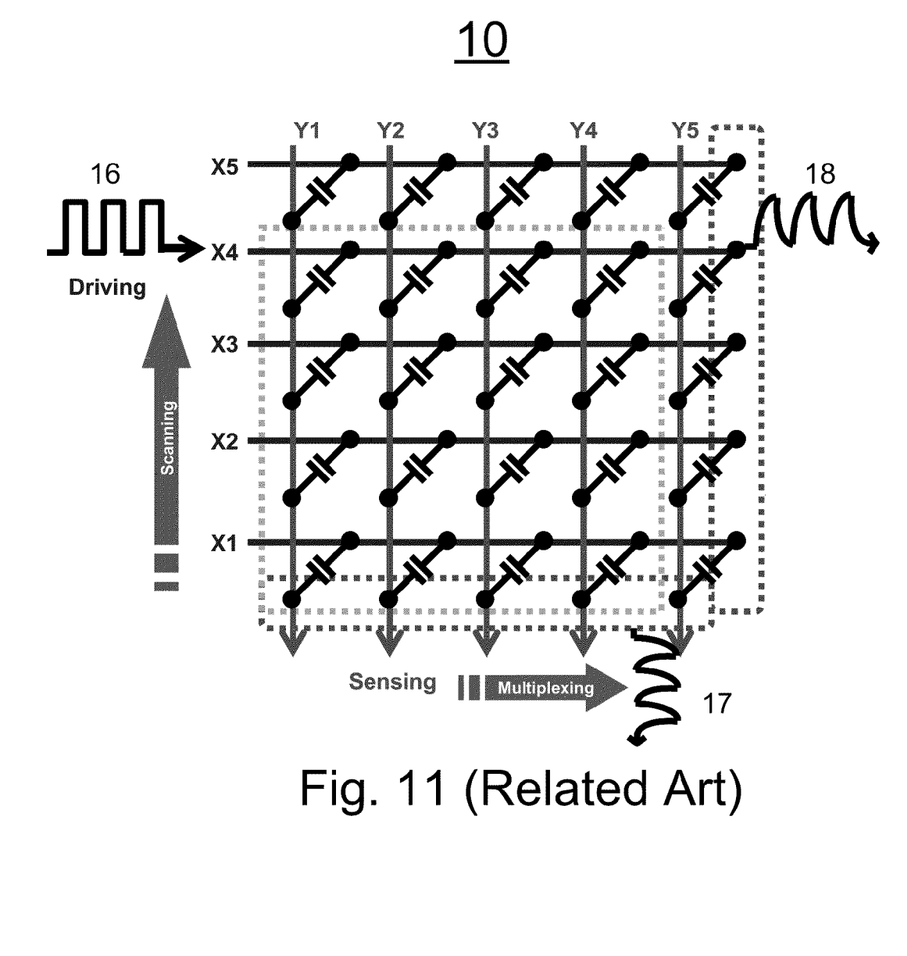
FIG. 11 shows schematically a circuit diagram of a conventional touch panel.
Figure 12:
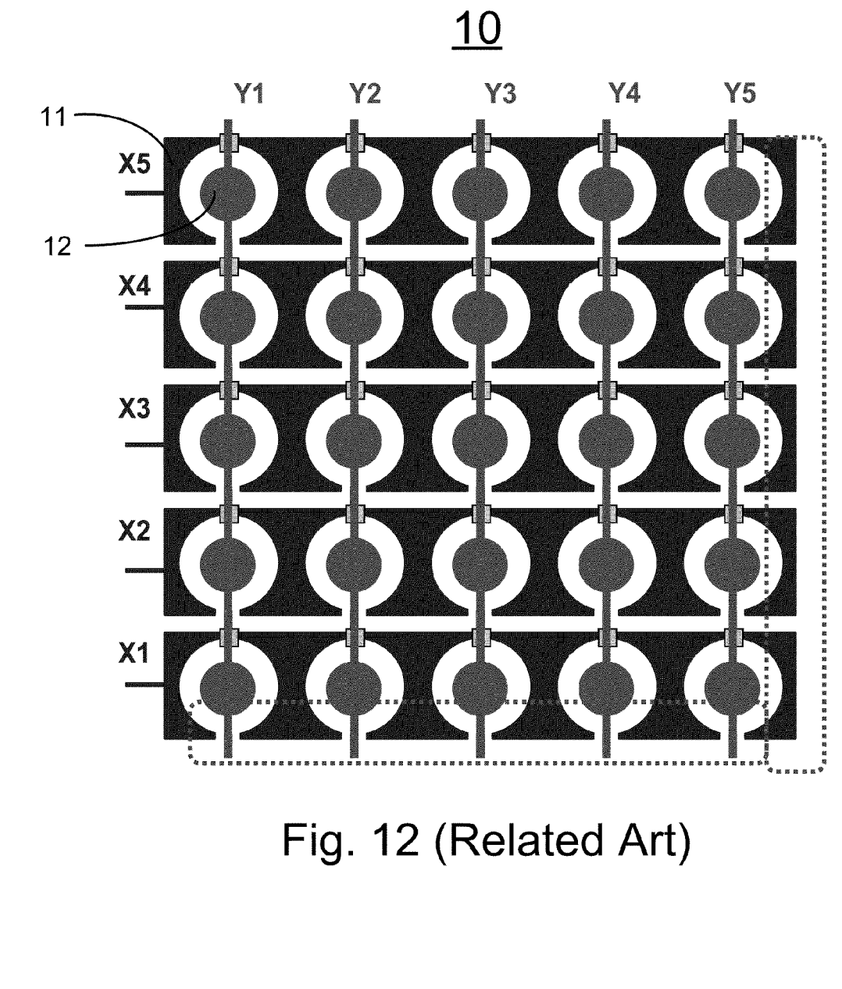
FIG. 12 shows schematically a structural layout of the conventional touch panel.

FIG. 11 and FIG. 12 show a conventional touch device 10 having 5 driving electrode strips 11, 5×5 sensing electrodes 12 arranged in a 5×5 matrix, 5 driving lines X1-X5, arranged alone the row direction, and 5 sensing lines Y1-Y5, arranged alone the column direction. Each driving electrode strip 11 is electrically connected to a corresponding driving line X1-X5. Each sensing electrode 12 in a column is electrically connected to each other by a corresponding sensing line Y1-Y5. For the conventional touch device 10, the driving signals 18 and the sensing signals 17 of sensing electrodes in distal areas are substantially deformed, comparing to a driving signal 16 applied to a driving electrode strip, due to the RC loading of the driving electrodes 11 and/or sensing electrodes 12. The larger the touch device is, the worse the deformation of the sensing signals is. The deformation of the sensing signals may result in poor performance of the touch device.

Therefore, a heretofore unaddressed need exists in the art to address the aforementioned deficiencies and inadequacies.

SUMMARY OF THE INVENTION

The present invention, in one aspect, relates to a multi-channel touch panel. In one embodiment, the multi-channel touch panel includes a plurality of driving electrodes spatial-separately arranged in the form of a matrix, and a plurality of sensing electrodes associated with the plurality of driving electrodes such that each sensing electrode is surrounded by a corresponding driving electrode, wherein the plurality of driving electrodes and the plurality of sensing electrodes define an electrode matrix having N rows and M columns, each of N and M being a positive integer.

In one embodiment, each of the plurality of sensing electrodes and the corresponding one of the plurality of driving electrodes are electrically insulated from one another. Each of the plurality of sensing electrodes and the corresponding one of the plurality of driving electrodes define a sensing capacitor. Additionally, each of the plurality of sensing electrodes and the corresponding one of the plurality of driving electrodes that surrounds the sensing electrode are spatially separated from one another. In one embodiment, each of the plurality of driving electrodes is formed to have a body portion and a bridge electrically connected the body portion to a corresponding driving line $X_n$, each of the plurality of sensing electrodes is formed to have a body portion and a bridge electrically connected the body portion to a corresponding sensing line of the M pairs of sensing lines, where the body portion of each of the plurality of sensing electrodes has a geometric shape of circle, oval, diamond, square, triangle, or polygon. Further, the body portion of each of the plurality of driving electrodes has a concave edge defining a space that is substantially complementary to the geometric shape of the body portion of each sensing electrode.

In one embodiment, the plurality of driving electrodes and the plurality of sensing electrodes are formed of a thin layer of one or more transparent, conductive materials. In another embodiment, the plurality of driving electrodes and the plurality of sensing electrodes are formed of a thin layer of one or more non-transparent, conductive materials.

The multi-channel touch panel also includes N driving lines, $\{X_n\}$, n=1, 2, ..., N, spatial-separately arranged along a row direction of the electrode matrix, and M pairs of sensing lines, $\{Y_{m-1}, Y_{m-2}\}$, m=1, 2, ..., M, spatial-separately arranged crossing over the N driving lines $\{X_n\}$ along a column direction of the electrode matrix, the column direction being perpendicular to the row direction. Each driving electrode in the n-th row of the electrode matrix is electrically connected to each other by a corresponding driving line $X_n$. Each odd sensing electrode in the m-th column of the electrode matrix is electrically connected to each other by a first sensing line $Y_{m-1}$ of the m-th paired sensing lines $Y_{m-1}$ and $Y_{m-2}$, while each even sensing electrode in the m-th column of the electrode matrix is electrically connected to each other by a second sensing line $Y_{m-2}$ of the m-th paired sensing lines $Y_{m-1}$ and $Y_{m-2}$.

In one embodiment, each of the N driving lines $\{X_n\}$ and each of the M pairs of sensing lines, $\{Y_{m-1}, Y_{m-2}\}$ are electrically insulated from one another. The intersection of a driving line $X_n$ and a sensing line $Y_{m-1}$ or $Y_{m-2}$ crossing over the driving line $X_n$ comprises an insulative layer of a non-conductive material that spatially separates the driving line $X_n$ from the sensing line $Y_{m-1}$ or $Y_{m-2}$.

In another aspect, the present invention relates to a multi-channel touch panel. In one embodiment, the multi-channel touch panel has a plurality of driving electrodes spatial-separately arranged in the form of a matrix, a plurality of sensing electrodes associated with the plurality of driving electrodes such that each sensing electrode is surrounded by a corresponding driving electrode, wherein the plurality of driving electrodes and the plurality of sensing electrodes define an electrode matrix having N rows and M columns, each of N and M being a positive integer, N pairs of driving lines, $\{X_{n-1}, X_{n-2}\}$, n=1, 2, ..., N, spatial-separately arranged along a row direction of the electrode matrix, and M sensing lines, $\{Y_m\}$, m=1, 2, ..., M, spatial-separately arranged crossing over the N pairs of driving lines, $\{X_{n-1}, X_{n-2}\}$ along a column direction of the electrode matrix, the column direction being perpendicular to the row direction. Each odd driving electrode in the n-th row of the electrode matrix is electrically connected to each other by a first driving line $X_{n-1}$ of the n-th paired driving lines $X_{n-1}$ and $X_{n-2}$, and each even driving electrode in the n-th row of the electrode matrix is electrically connected to each other by a second driving line $X_{n-2}$ of the n-th paired driving lines $X_{n-1}$ and $X_{n-2}$. And each sensing electrode in the m-th column of the electrode matrix is electrically connected to each other by a corresponding sensing line $Y_m$.

In one embodiment, each of the N pairs of driving lines $\{X_{n-1}, X_{n-2}\}$ and each of the M sensing lines $\{Y_m\}$ are electrically insulated from one another. The intersection of a driving line $X_{n-1}$ or $X_{n-2}$ and a sensing line $Y_m$ crossing over the driving line $X_{n-1}$ or $X_{n-2}$ comprises an insulating layer of a non-conductive material that spatially separates the driving line $X_{n-1}$ or $X_{n-2}$ from the sensing line $Y_m$.

In one embodiment, each of the plurality of sensing electrodes and the corresponding one of the plurality of driving electrodes are electrically insulated from one another. Each of the plurality of sensing electrodes and the corresponding one of the plurality of driving electrodes define a sensing capacitor. Additionally, each of the plurality of sensing electrodes and the corresponding one of the plurality of driving electrodes that surrounds the sensing electrode are spatially separated from one another. In one embodiment, each of the plurality of driving electrodes is formed to have a body portion and a bridge electrically connected the body portion to a corresponding driving line of the N pairs of driving lines. Each of the plurality of sensing electrodes is formed to have a body portion and a bridge electrically connected the body portion to a corresponding sensing line $Y_m$, where the body portion of each of the plurality of sensing electrodes has a geometric shape of circle, oval, diamond, square, triangle, or polygon. Further, the body portion of each of the plurality of driving electrodes has a concave edge defining a space that is substantially complementary to the geometric shape of the body portion of each sensing electrode.

In one embodiment, the plurality of driving electrodes and the plurality of sensing electrodes are formed of a thin layer of one or more transparent, conductive materials. In another embodiment, the plurality of driving electrodes and the plurality of sensing electrodes are formed of a thin layer of one or more non-transparent, conductive materials.

In yet another aspect, the present invention relates to a multi-channel touch panel. In one embodiment, the multi-channel touch panel has a plurality of driving electrodes spatial-separately arranged in the form of a matrix, and a plurality of sensing electrodes associated with the plurality of driving electrodes such that each sensing electrode and a corresponding driving electrode define a sensing capacitor therebetween, wherein the plurality of driving electrodes and the plurality of sensing electrodes define an electrode matrix having N rows and M columns, each of N and M being a positive integer.

In one embodiment, each of the plurality of sensing electrodes and the corresponding one of the plurality of driving electrodes are electrically insulated from one another. Each of the plurality of sensing electrodes is surrounded by a corresponding one of the plurality of driving electrodes and wherein the driving electrode and the corresponding sensing electrode are spatially separated from one another.

Furthermore, the multi-channel touch panel has N groups of driving lines, $\{X_{n-j}\}$, n=1, 2, ..., N, j=1, 2, ..., J, and J is a positive integer, spatial-separately arranged along a row direction of the electrode matrix, each group having J driving lines, $X_{n-1}, X_{n-2}, \ldots, X_{n-J}$, and M groups of sensing lines, $\{Y_{m-k}\}$, m=1, 2, ..., M, k=1, 2, ..., K, and K is a positive integer, spatial-separately arranged crossing over the N groups of driving lines $\{X_{n-j}\}$ along a column direction of the electrode matrix, the column direction being perpendicular to the row direction, each group having K sensing lines, $Y_{m-1}, Y_{m-2}, \ldots, Y_{m-K}$. In one embodiment, each of the N group of driving lines $\{X_{n-j}\}$ and each of the M group of sensing lines $\{Y_{m-k}\}$ are electrically insulated from one another.

Each of j-th, (J+j)-th, (2J+j)-th, (3J+j)-th, ... driving electrodes in the n-th row of the electrode matrix is electrically connected to each other by the j-th driving line $X_{n-j}$ of the n-th group of driving lines $X_{n-1}, X_{n-2}, \ldots,$ and $X_{n-J}$. And each of k-th, (K+k)-th, (2K+k)-th, (3K+k)-th, ... sensing electrodes in the m-th column of the electrode matrix is electrically connected to each other by the k-th sensing line $Y_{m-k}$ of the m-th group of sensing lines $Y_{m-1}, Y_{m-2}, \ldots, Y_{m-K}$.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

The description will be made as to the embodiments of the present invention in conjunction with the accompanying drawings in FIGS. 1-10. In accordance with the purposes of this invention, as embodied and broadly described herein, this invention, in one aspect, relates to a multi-channel touch panel that can reduce substantially RC loading of driving electrodes and sensing electrodes.

In one embodiment, the multi-channel touch panel has a plurality of driving electrodes spatial-separately arranged in the form of a matrix, and a plurality of sensing electrodes associated with the plurality of driving electrodes such that each sensing electrode and a corresponding driving electrode define a sensing capacitor therebetween. The plurality of driving electrodes and the plurality of sensing electrodes define an electrode matrix having N rows and M columns, each of N and M is a positive integer. Each of the plurality of sensing electrodes and the corresponding one of the plurality of driving electrodes are electrically insulated from one another.

In one embodiment, each of the plurality of sensing electrodes is surrounded by a corresponding one of the plurality of driving electrodes and the driving electrode and the corresponding sensing electrode are spatially separated from one another.

Furthermore, the multi-channel touch panel has N groups of driving lines, $\{X_{n-j}\}$, spatial-separately arranged along a row direction of the electrode matrix, n=1, 2, . . . , N, j=1, 2, . . . , J, and J is a positive integer. Each driving line group has J driving lines, $X_{n-1}, X_{n-2}, \ldots, X_{n-J}$. The multi-channel touch panel also has M groups of sensing lines, $\{Y_{m-k}\}$, spatial-separately arranged crossing over the N groups of driving lines $\{X_{n-j}\}$ along a column direction of the electrode matrix, where m=1, 2, . . . , M, k=1, 2, . . . , K, and K is a positive integer, and the column direction is perpendicular to the row direction. Each sensing line group has K sensing lines, $Y_{m-1}, Y_{m-2}, \ldots, Y_{m-K}$. Each of the N group of driving lines $\{X_{n-j}\}$ and each of the M group of sensing lines $\{Y_{m-k}\}$ are electrically insulated from one another.

According to the present invention, each of j-th, (J+j)-th, (2J+j)-th, (3J+j)-th, . . . driving electrodes in the n-th row in the electrode matrix is electrically connected to each other by the j-th driving line $X_{n-j}$ of the n-th group of driving lines $X_{n-1}, X_{n-2}, \ldots,$ and $X_{n-J}$. And each of k-th, (K+k)-th, (2K+k)-th, (3K+k)-th, . . . sensing electrodes in the m-th column of the electrode matrix is electrically connected to each other by the k-th sensing line $Y_{m-k}$ of the m-th group of sensing lines $Y_{m-1}, Y_{m-2}, \ldots, Y_{m-K}$.

As disclosed above, the multi-channel touch panel has N×M driving electrodes, N×M sensing electrodes, N groups of driving lines $\{X_{n-j}\}$, and M group of sensing lines $\{Y_{m-k}\}$. Each driving line group has J driving lines, $X_{\mu-1}, X_{n-2}, \ldots, X_{n-J}$. Each sensing line group has K sensing lines, $Y_{m-1}, Y_{m-2}, \ldots, Y_{m-K}$. J and K can be any integer greater than zero. Generally, each of N and M is much greater than L or K. Without intent to limit the scope of the invention, exemplary multi-channel touch panels according to the embodiments of the present invention are given below.

Figure 1:
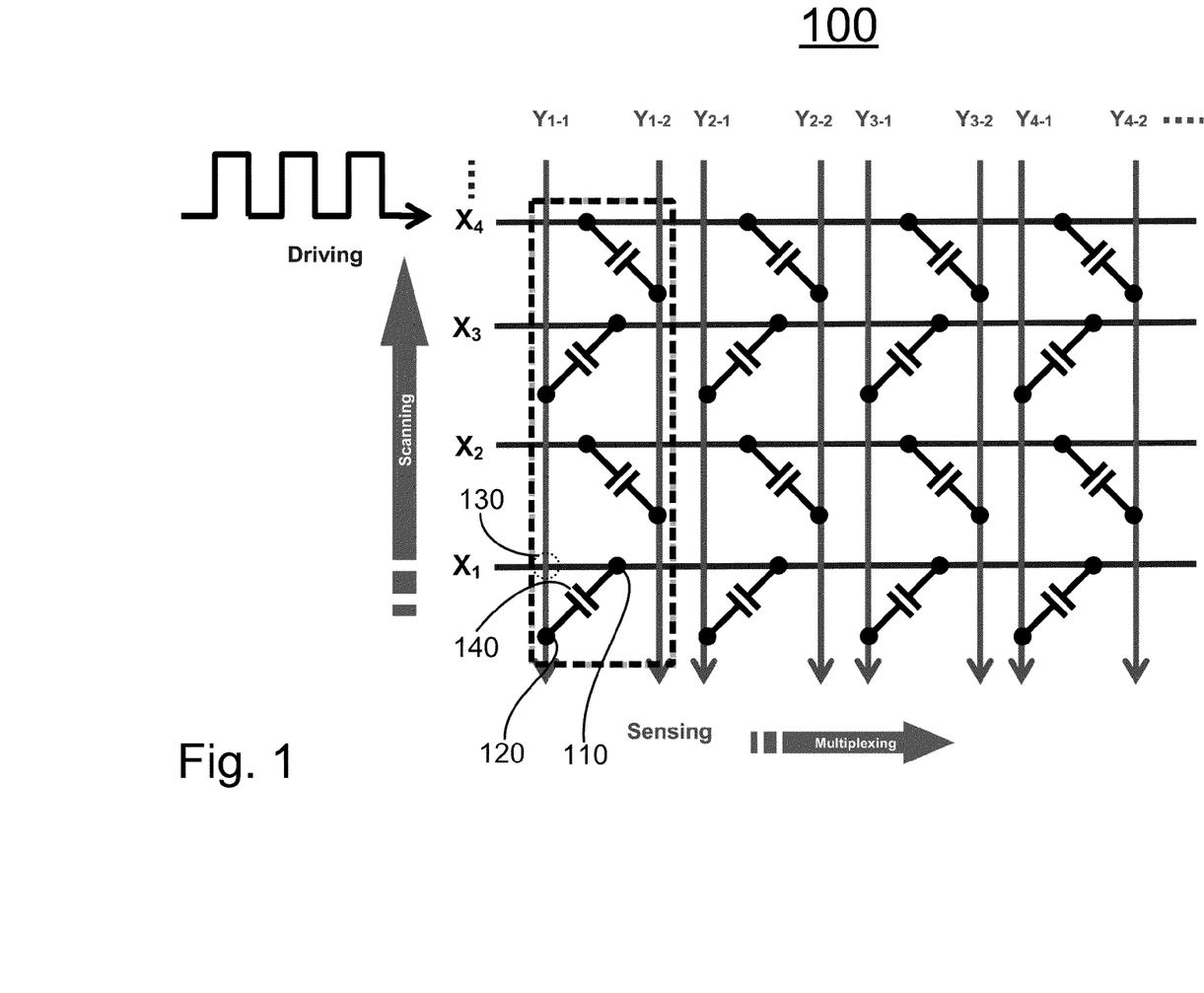
FIG. 1 shows schematically a circuit diagram of a multi-channel touch panel according to one embodiment of the present invention.
Figure 2:
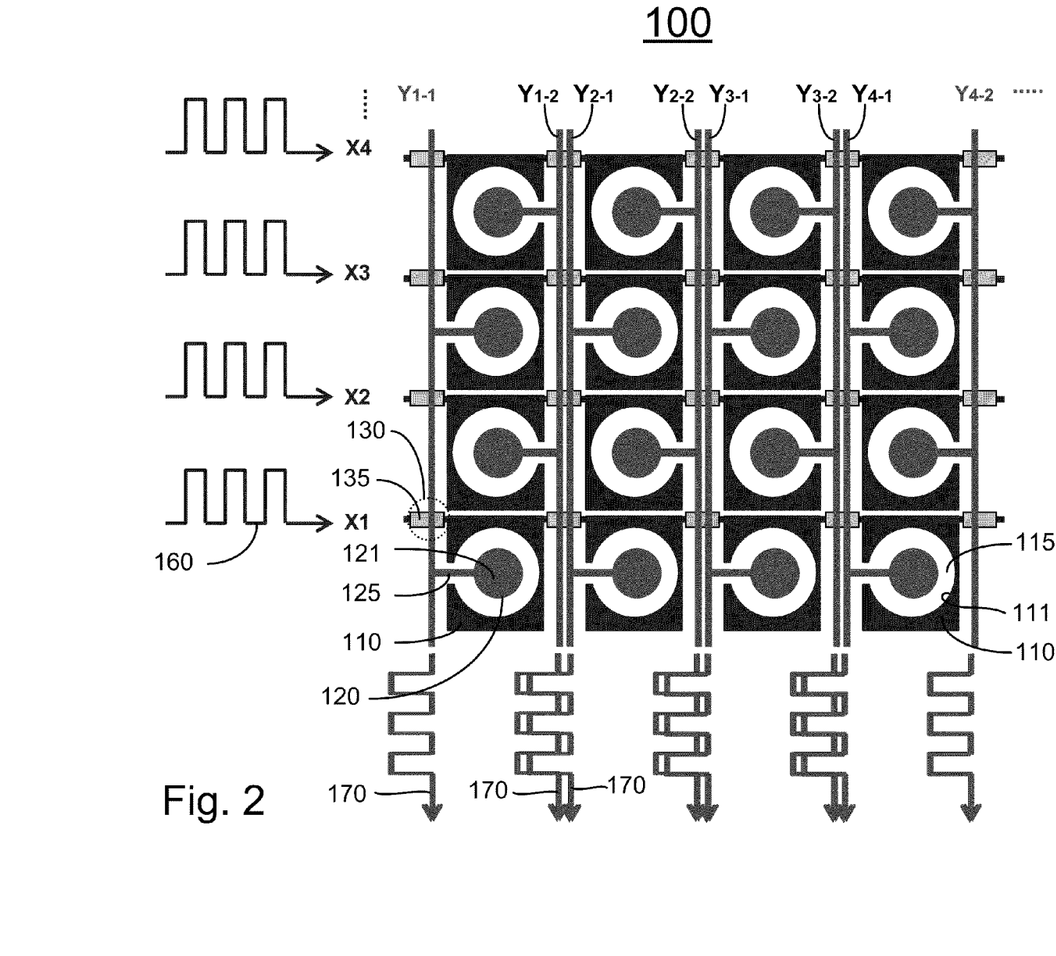
FIG. 2 shows schematically a structural layout of the multi-channel touch panel shown in FIG. 1, wherein sensing signal 170 output from each m-th paired sensing lines $Y_{m-1}$ and $Y_{m-2}$, m=1, 2, 3 and 4 is synchronous.

Referring to FIGS. 1 and 2, a multi-channel touch panel 100 is shown according to one embodiment of the present invention. In the exemplary embodiment, N×M=4×4, J=1 and K=2. In practice, N and M are much greater than J or K.

The multi-channel touch panel 100 includes sixteen (16) driving electrodes 110 spatial-separately arranged in a 4×4 matrix, sixteen (16) sensing electrodes 120 associated with the sixteen (16) driving (first) electrodes 110. The driving electrodes 110 and the sensing electrodes 120 define a 4×4 electrode matrix having 4 rows and 4 columns. The multi-channel touch panel 100 also includes four (4) driving lines $X_1, X_2, .X_3$ and $X_4$, and four (4) pairs of sensing lines $(Y_{1-1}, Y_{1-2}), (Y_{2-1}, Y_{2-2}), (Y_{3-1}, Y_{3-2})$ and $(Y_{4-1}, Y_{4-2})$. The driving lines $X_1, X_2, .X_3$ and $X_4$ are spatial-separately arranged along the row direction of the electrode matrix. The sensing lines $(Y_{1-1}, Y_{1-2}), (Y_{2-1}, Y_{2-2}), (Y_{3-1}, Y_{3-2})$ and $(Y_{4-1}, Y_{4-2})$ are spatial-separately arranged crossing over the driving lines $X_1, X_2, .X_3$ and $X_4$ along a column direction of the electrode matrix, where the column direction is perpendicular to the row direction.

As shown in FIG. 2, each sensing electrode 120 is surrounded by a corresponding driving electrode 110. Each sensing electrodes 120 is formed to have a body portion 121 and a bridge 125. The bridge 125 is adapted for electrically connecting the body portion 121 to a corresponding sensing line $Y_{1-1}, Y_{1-2}, Y_{2-1}, Y_{2-2}, Y_{3-1}, Y_{3-2}, Y_{4-1}$ or $Y_{4-2}$. The body portion 121 of the sensing electrodes 120 has a geometric shape of circle. Accordingly, each driving electrode 110 is formed to have a concave edge 111 defining a space 115 that is substantially complementary to the geometric shape of the body portion 121 of each sensing electrode 120. In practice, the body portion 121 of the sensing electrodes 120 may have a geometric shape of oval, diamond, square, triangle, polygon or the likes.

Each sensing electrode 120 and the corresponding driving electrode 110 are spatially separated from one another, also electrically insulated from one another, and define a sensing capacitor 140 therebetween. The driving electrodes 110 and the sensing electrodes 120 can be formed in a single layer or a multilayer. For example, the driving electrodes 110 and the sensing electrodes 120 can spatial-separately be formed on a substrate, and an insulating medium or material is deposited in the space between each driving electrode 110 and its corresponding sensing electrode 120. If the driving electrodes 110 and the sensing electrodes 120 are formed in different layers, an insulating layer is formed between the driving electrode layer and the sensing electrode layer. Each of the driving electrodes 110 and the sensing electrodes 120 is formed of an electrically conductive material. The electrically conductive material can be transparent, or non-transparent to light transmission.

Additionally, the driving lines $X_1, X_2, .X_3$ and $X_4$ and the sensing lines $(Y_{1-1}, Y_{1-2}), (Y_{2-1}, Y_{2-2}), (Y_{3-1}, Y_{3-2})$ and $(Y_{4-1}, Y_{4-2})$ are electrically insulated from one another. The intersection 130 of a driving line $X_n$ and a sensing line $Y_{m-1}$ or $Y_{m-2}$ crossing over the driving line $X_n$ has an insulative layer 135 of a non-conductive material that spatially separates the driving line $X_n$ from the sensing line $Y_{m-1}$ or $Y_{m-2}$.

The driving electrodes 110 and the sensing electrodes 120 are electrically connected to each other by the four driving lines $X_1, X_2, .X_3$ and $X_4$, and the four pairs of sensing lines $(Y_{1-1}, Y_{1-2}), (Y_{2-1}, Y_{2-2}), (Y_{3-1}, Y_{3-2})$ and $(Y_{4-1}, Y_{4-2})$, in a particular configuration. For example, as shown in FIGS. 1 and 2, each driving electrode 110 in the n-th row of the electrode matrix is electrically connected to each other by a corresponding driving line $X_n$, where n=1, 2, 3 and 4. Each odd sensing electrode 120, i.e., the first and third sensing electrodes, in the m-th column of the electrode matrix is electrically connected to each other by the first sensing line $Y_{m-1}$ of the m-th paired sensing lines $Y_{m-1}$ and $Y_{m-2}$, while each even sensing electrode 120, i.e., the second and fourth sensing electrodes, in the m-th column of the electrode matrix is electrically connected to each other by a second sensing line $Y_{m-2}$ of the m-th paired sensing lines $Y_{m-1}$ and $Y_{m-2}$, where m=1, 2, 3 and 4.

For such a configuration, when a driving signal 160 are applied to each of the driving lines $X_1, X_2, .X_3$ and $X_4$ to drive the driving electrodes 110, each sensing signal 170 output from each sensing lines $(Y_{1-1}, Y_{1-2}), (Y_{2-1}, Y_{2-2}), (Y_{3-1}, Y_{3-2})$ and $(Y_{4-1}, Y_{4-2})$ is same as the driving signal 160 with no decay. Wherein sensing signal 170 output from each m-th paired sensing lines $Y_{m-1}$ and $Y_{m-2}$, m=1, 2, 3 and 4 is synchronous.

In this exemplary embodiment, the RC loading of the sensing electrodes 120 is reduced.

Figure 3:
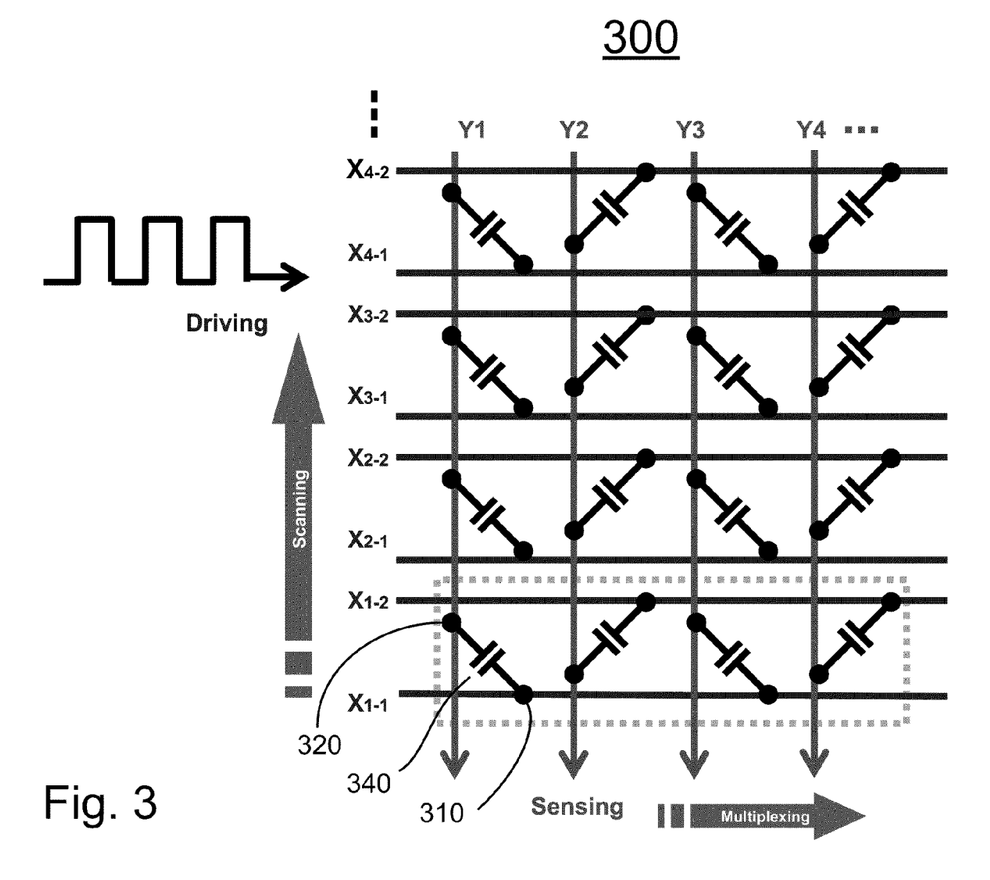
FIG. 3 shows schematically a circuit diagram of a multi-channel touch panel according to another embodiment of the present invention.
Figure 4:
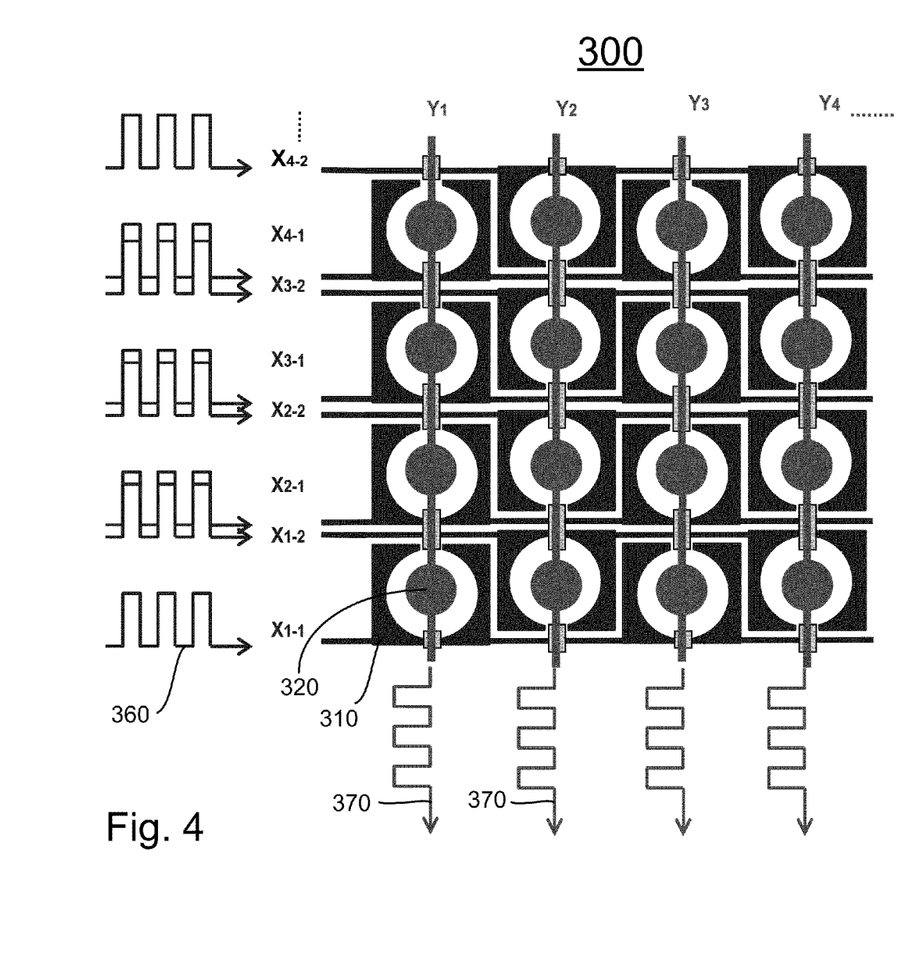
FIG. 4 shows schematically a structural layout of the multi-channel touch panel shown in FIG. 3, wherein driving signal 360 drive each n-th paired driving lines $X_{n-1}$ and $X_{n-2}$, n=1, 2, 3 and 4 is synchronous.

FIGS. 3 and 4 show a multi-channel touch panel 300 is shown according to another embodiment of the present invention. In the exemplary embodiment, N×M=4×4, J=2 and K=1.

The multi-channel touch panel 300 includes sixteen (16) driving electrodes 310 spatial-separately arranged in a 4×4 matrix, sixteen (16) sensing electrodes 320 associated with the sixteen (16) driving (first) electrodes 310. The driving electrodes 310 and the sensing electrodes 320 define a 4×4 electrode matrix having 4 rows and 4 columns. The structures and layouts of the driving electrodes 310 and the sensing electrodes 320 are same as those of the multi-channel touch panel shown in FIG. 4.

The multi-channel touch panel 300 further includes and four (4) pairs of driving lines $(X_{1-1}, X_{1-2}), (X_{2-1}, X_{2-2}), (X_{3-1}, X_{3-2})$ and $(X_{4-1}, X_{4-2})$, and four (4) sensing lines $Y_1, Y_2, .Y_3$ and $Y_4$.

The driving lines $(X_{1-1}, X_{1-2}), (X_{2-1}, X_{2-2}), (X_{3-1}, X_{3-2})$ and $(X_{4-1}, X_{4-2})$ are spatial-separately arranged along the row direction of the electrode matrix. The sensing lines $Y_1, Y_2, .Y_3$ and $Y_4$ are spatial-separately arranged crossing over the driving lines $(X_{1-1}, X_{1-2}), (X_{2-1}, X_{2-2}), (X_{3-1}, X_{3-2})$ and $(X_{4-1}, X_{4-2})$ along a column direction of the electrode matrix.

In this exemplary embodiment, each odd driving electrode 310, i.e., the first and third driving electrodes, in the n-th row of the electrode matrix is electrically connected to each other by a first driving line $X_{n-1}$ of the n-th paired driving lines $X_{n-1}$ and $X_{n-2}$, while each even driving electrode 310, i.e., the second and fourth driving electrodes, in the n-th row of the electrode matrix is electrically connected to each other by a second driving line $X_{n-2}$ of the n-th paired driving lines $X_{n-1}$ and $X_{n-2}$, where n=1, 2, 3 and 4. Each sensing electrode 320 in the m-th column of the electrode matrix is electrically connected to each other by a corresponding sensing line $Y_m$, where m=1, 2, 3 and 4.

In the exemplary embodiment, when a driving signal 360 are applied to each of the driving lines $(X_{1-1}, X_{1-2}), (X_{2-1}, X_{2-2}), (X_{3-1}, X_{3-2})$ and $(X_{4-1}, X_{4-2})$ to drive the driving electrodes 310, each sensing signal 370 output from each sensing lines $Y_l, Y_2, Y_3$ and $Y_4$ is same as the driving signal 360 with no decay. Wherein driving signal 360 drive each n-th paired driving lines $X_{n-1}$ and $X_{n-2}$, n=1, 2, 3 and 4 is synchronous. In this exemplary embodiment, the RC loading of the driving electrodes 310 is reduced.

Figure 5:
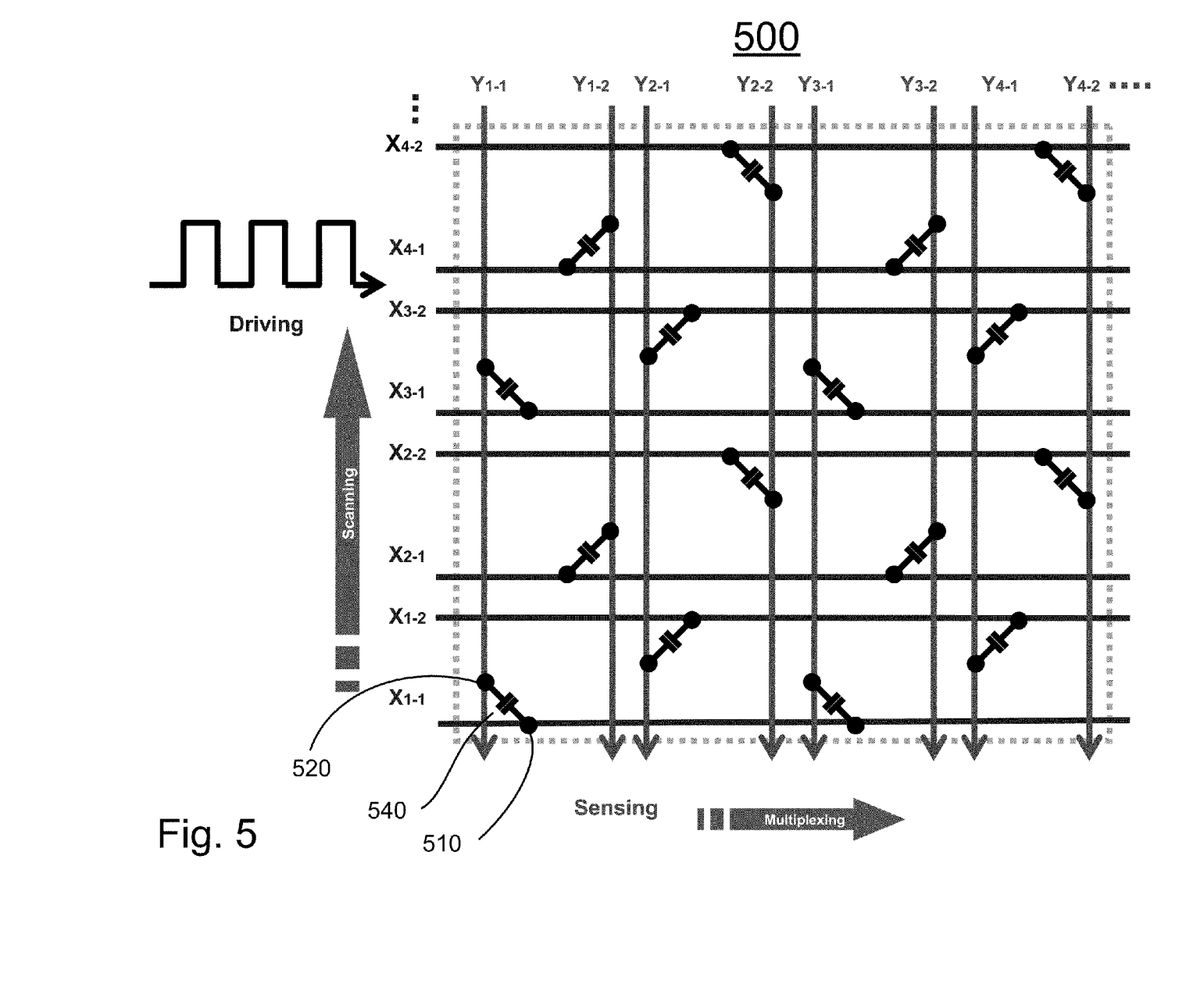
FIG. 5 shows schematically a circuit diagram of a multi-channel touch panel according to yet another embodiment of the present invention.
Figure 6:
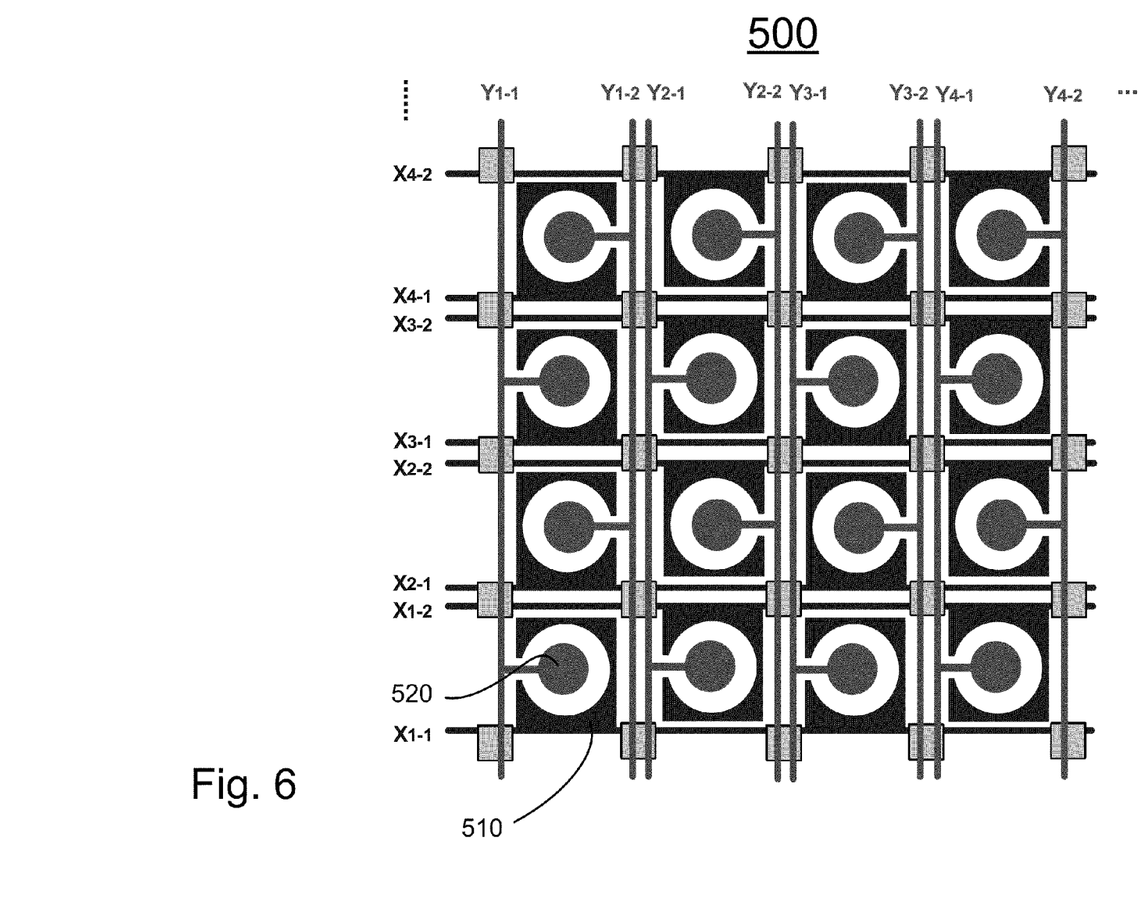
FIG. 6 shows schematically a structural layout of the multi-channel touch panel shown in FIG. 5.

FIGS. 5 and 6 shows a multi-channel touch panel 500 is shown according to yet another embodiment of the present invention. In the exemplary embodiment, N×M=4×4, J=2 and K=2. Each odd driving electrode 510, i.e., the first and third driving electrodes, in the n-th row of the electrode matrix is electrically connected to each other by a first driving line $X_{n-1}$ of the n-th paired driving lines $X_{n-1}$ and $X_{n-2}$, while each even driving electrode 510, i.e., the second and fourth driving electrodes, in the n-th row of the electrode matrix is electrically connected to each other by a second driving line $X_{n-2}$ of the n-th paired driving lines $X_{n-1}$ and $X_{n-2}$, where n=1, 2, 3 and 4. Additionally, each odd sensing electrode 520, i.e., the first and third sensing electrodes, in the m-th column of the electrode matrix is electrically connected to each other by a first sensing line $Y_{m-1}$ of the m-th paired sensing lines $Y_{m-1}$ and $Y_{m-2}$, while each even sensing electrode 520, i.e., the second and fourth sensing electrodes, in the m-th column of the electrode matrix is electrically connected to each other by a second sensing line $Y_{m-2}$ of the m-th paired sensing lines $Y_{m-1}$ and $Y_{m-2}$, where m=1, 2, 3 and 4. Each driving electrode 510 and the corresponding sensing electrode 520 define a sensing capacitor 540. In the embodiment, the RC loading of both the driving electrodes 510 and the sensing electrodes 520 can be reduced.

Figure 7:
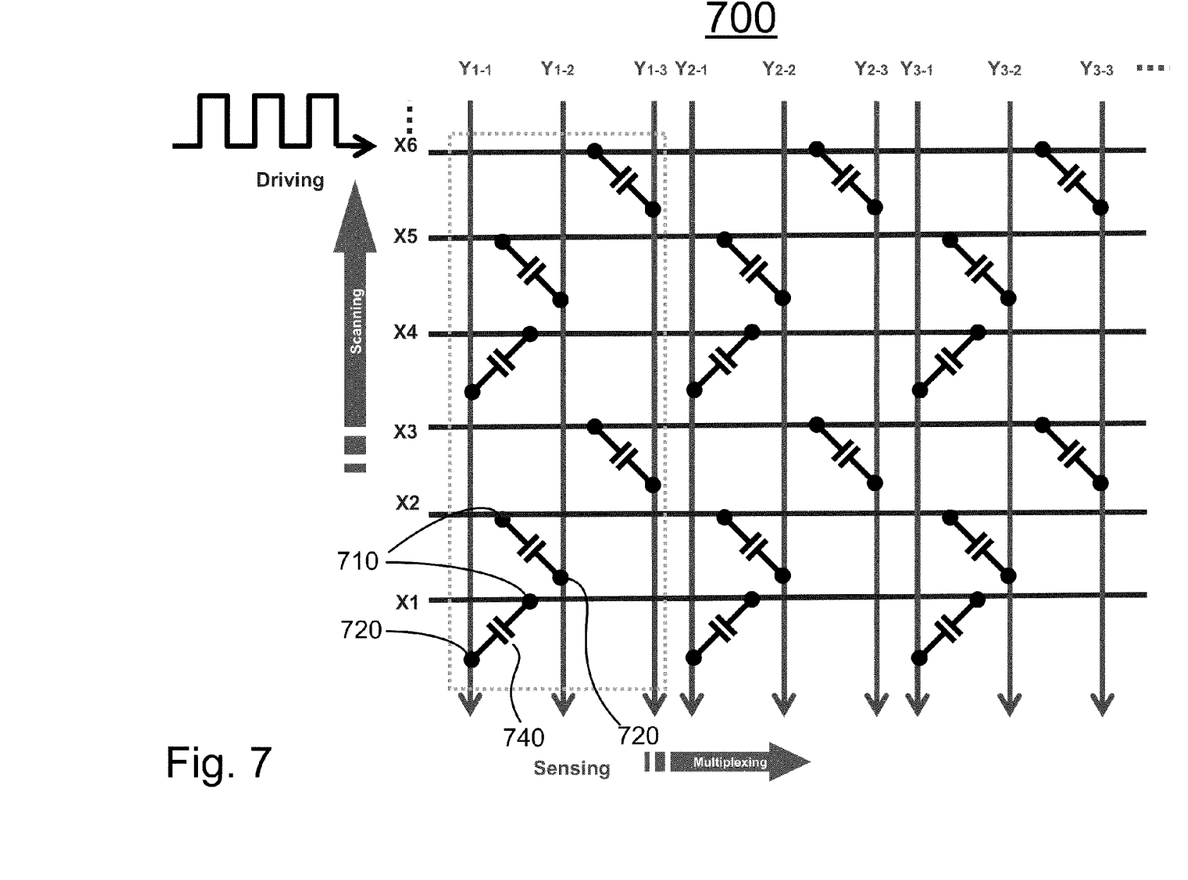
FIG. 7 shows schematically a circuit diagram of a multi-channel touch panel according to an alternative embodiment of the present invention.
Figure 8:
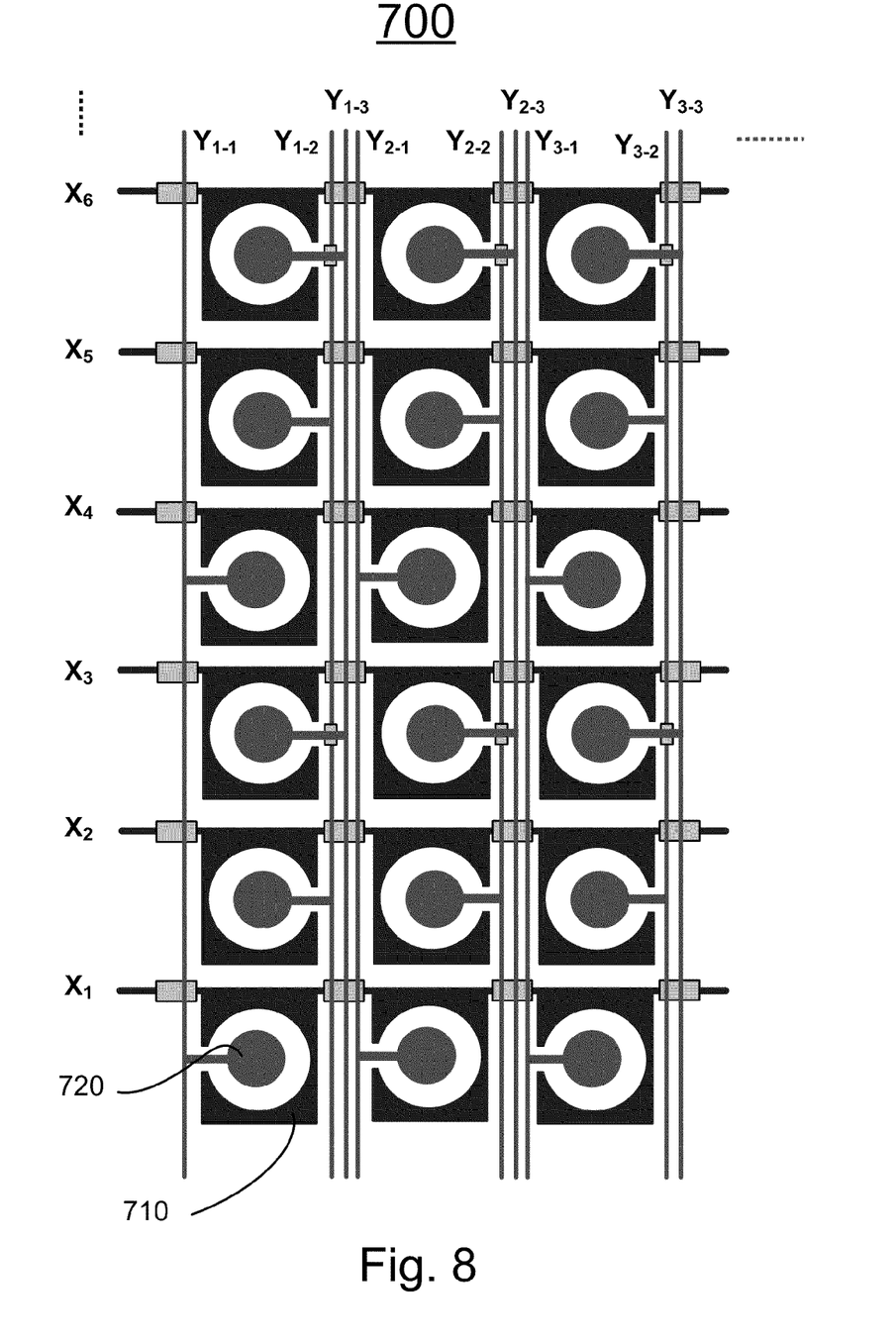
FIG. 8 shows schematically a structural layout of the multi-channel touch panel shown in FIG. 7.

Referring to FIGS. 7 and 8, a multi-channel touch panel 700 is shown according to one embodiment of the present invention. In the exemplary embodiment, N×M=6×3, J=1 and K=3.

The multi-channel touch panel 700 includes eighteen (18) driving electrodes 710 spatial-separately arranged in a 6×3 matrix, eighteen (18) sensing electrodes 720 associated with the eighteen (18) driving electrodes 710. The driving electrodes 710 and the sensing electrodes 720 define a 6×3 electrode matrix having 6 rows and 3 columns. Each driving electrode 710 and the corresponding sensing electrode 720 define a sensing capacitor 740. The multi-channel touch panel 700 also includes six (6) driving lines $X_1$, $X_2$, $X_3$, $X_4$, $X_5$ and $X_6$, and three groups of sensing lines ($Y_{1-1}$, $Y_{1-2}$, $Y_{1-3}$), ($Y_{2-1}$, $Y_{2-2}$, $Y_{2-3}$) and ($Y_{3-1}$, $Y_{3-2}$, $Y_{3-3}$). The driving lines $X_1$, $X_2$, $X_3$, $X_4$, $X_5$ and $X_6$, are spatial-separately arranged along the row direction of the electrode matrix. The sensing lines ($Y_{1-1}$, $Y_{1-2}$, $Y_{1-3}$), ($Y_{2-1}$, $Y_{2-2}$, $Y_{2-3}$) and ($Y_{3-1}$, $Y_{3-2}$, $Y_{3-3}$) are spatial-separately arranged crossing over the driving lines $X_1$, $X_2$, $X_3$, $X_4$, $X_5$ and $X_6$ along a column direction of the electrode matrix.

As shown in FIGS. 7 and 8, each driving electrode 710 is electrically connected each other by a corresponding driving line $X_n$, where n=1, 2, 3, 4, 5 and 6. The first and fourth sensing electrodes 720 in the m-th column of the electrode matrix is electrically connected to each other by the first sensing line $Y_{m-1}$ of the m-th grouped sensing lines ($Y_{m-1}$, $Y_{m-2}$, $Y_{m-3}$); the second and fifth sensing electrode 720 in the m-th column of the electrode matrix is electrically connected to each other by a second sensing line $Y_{m-2}$ of the m-th grouped sensing lines ($Y_{m-1}$, $Y_{m-2}$, $Y_{m-3}$); and the third and sixth sensing electrode 720 in the m-th column of the electrode matrix is electrically connected to each other by a third sensing line $Y_{m-3}$ of the m-th grouped sensing lines ($Y_{m-1}$, $Y_{m-2}$, $Y_{m-3}$), where m=1, 2 and 3. For such a configuration, the RC loading of the sensing electrodes can be reduced to one-third.

Figure 9:
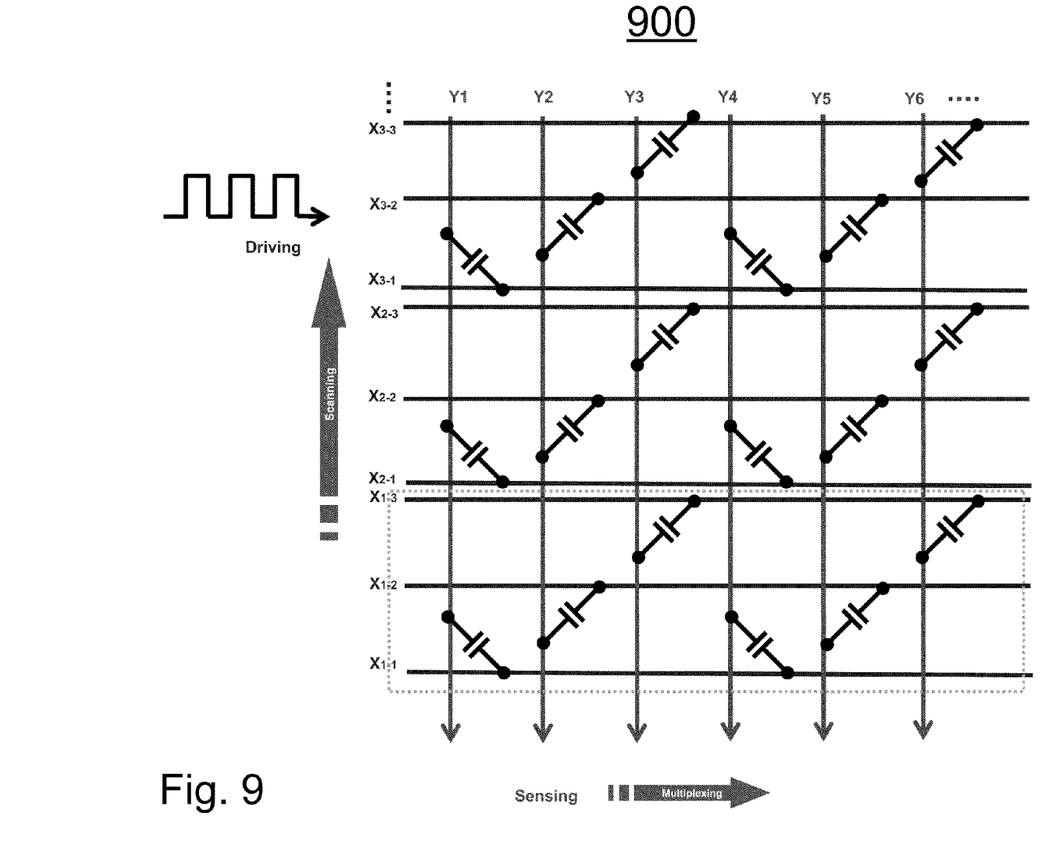
FIG. 9 shows schematically a circuit diagram of a multi-channel touch panel according to another embodiment of the present invention.
Figure 10:
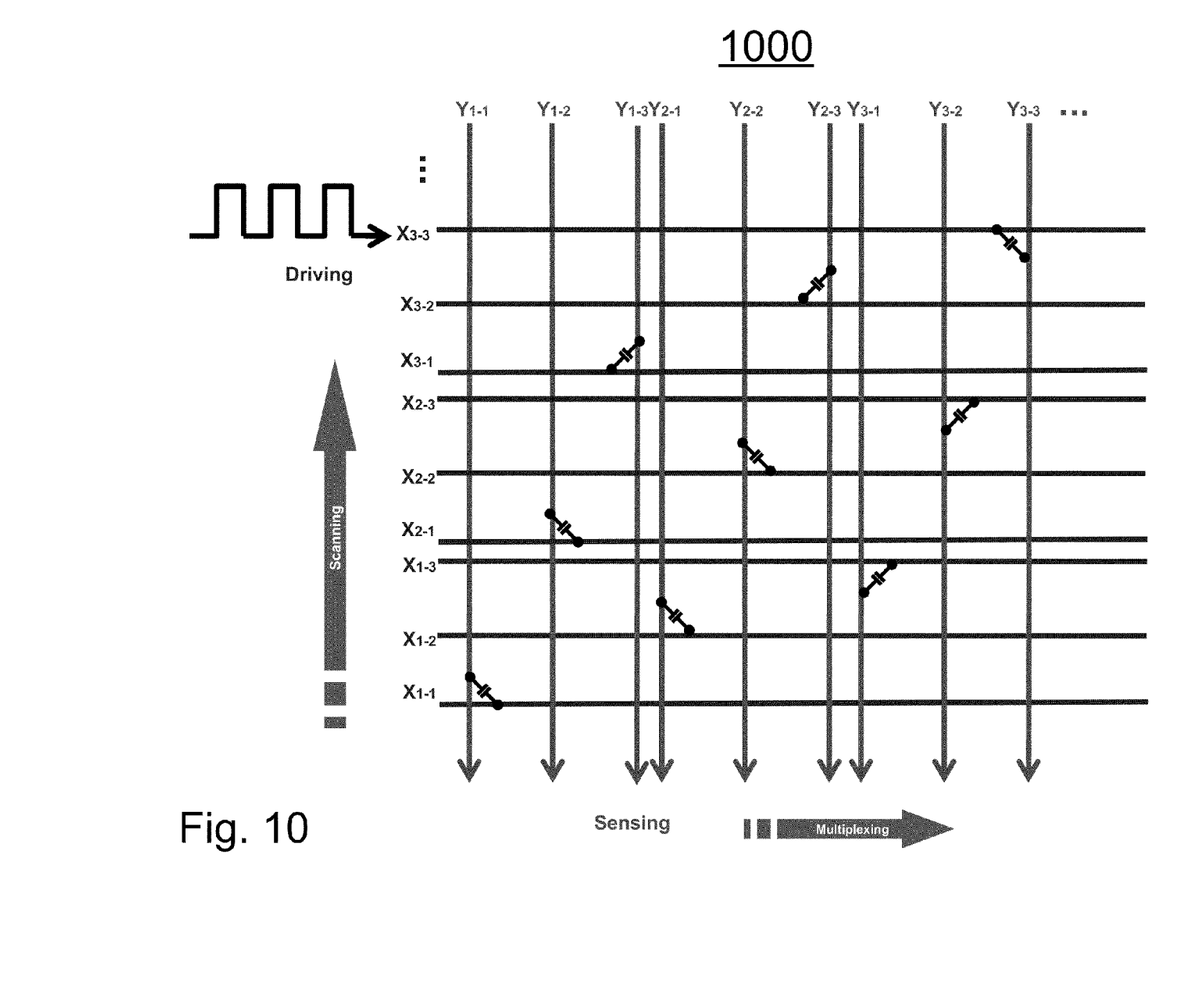
FIG. 10 shows schematically a circuit diagram of a multi-channel touch panel according to yet another embodiment of the present invention.

FIGS. 9 and 10 respectively show multi-channel touch panels 900 and 1000 according to two embodiments of the present invention. For multi-channel touch panel 900, N×M=3×6, J=3 and K=1. Accordingly, the RC loading of the driving electrodes can be reduced to one-third.

For multi-channel touch panel 1000, N×M=3×3, J=3 and K=3. The RC loading of both the driving electrodes and the sensing electrodes can be reduced to one-third.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A multi-channel touch panel, comprising:
   (a) a plurality of driving electrodes spatial-separately arranged in the form of a matrix;
   (b) a plurality of sensing electrodes associated with the plurality of driving electrodes such that each sensing electrode is surrounded by a corresponding driving electrode, wherein the plurality of driving electrodes and the plurality of sensing electrodes define an electrode matrix having N rows and M columns, each of N and M being a positive integer;
   (c) N driving lines, $\{X_n\}$, n=1, 2, . . . , N, spatial-separately arranged along a row direction of the electrode matrix;
   (d) M pairs of sensing lines, $\{Y_{m-1}, Y_{m-2}\}$, m=1, 2, . . . , M, spatial-separately arranged crossing over the N driving lines $\{X_n\}$ along a column direction of the electrode matrix, the column direction being perpendicular to the row direction,
   wherein each driving electrode in the n-th row of the electrode matrix is electrically connected to each other by a corresponding driving line $X_n$; and
   wherein each odd sensing electrode in the m-th column of the electrode matrix is electrically connected to each other by a first sensing line $Y_{m-1}$ of the m-th paired sensing lines $Y_{m-1}$ and $Y_{m-2}$, and each even sensing electrode in the m-th column of the electrode matrix is electrically connected to each other by a second sensing line $Y_{m-2}$ of the m-th paired sensing lines $Y_{m-1}$ and $Y_{m-2}$.

2. The multi-channel touch panel of claim 1, wherein each of the plurality of sensing electrodes and the corresponding one of the plurality of driving electrodes are electrically insulated from one another.

3. The multi-channel touch panel of claim 1, wherein each of the plurality of sensing electrodes and the corresponding one of the plurality of driving electrodes that surrounds the sensing electrode are spatially separated from one another.

4. The multi-channel touch panel of claim 3, wherein each of the plurality of sensing electrodes is formed to have a body portion and a bridge electrically connected the body portion to a corresponding sensing line of the M pairs of sensing lines.

5. The multi-channel touch panel of claim 4, wherein the body portion of each of the plurality of sensing electrodes has a geometric shape of circle, oval, diamond, square, triangle, or polygon.

6. The multi-channel touch panel of claim 5, wherein each of the plurality of driving electrodes has a concave edge defining a space that is substantially complementary to the geometric shape of the body portion of each sensing electrode.

7. The multi-channel touch panel of claim 1, wherein the plurality of driving electrodes and the plurality of sensing electrodes are formed of a thin layer of one or more conductive materials.

8. A multi-channel touch panel, comprising:
   (a) a plurality of driving electrodes spatial-separately arranged in the form of a matrix;
   (b) a plurality of sensing electrodes associated with the plurality of driving electrodes such that each sensing electrode is surrounded by a corresponding driving electrode, wherein the plurality of driving electrodes and the plurality of sensing electrodes define an electrode matrix having N rows and M columns, each of N and M being a positive integer;
   (c) N pairs of driving lines, $\{X_{n-1}, X_{n-2}\}$, n=1, 2, . . . , N, spatial-separately arranged along a row direction of the electrode matrix;
   (d) M sensing lines, $\{Y_m\}$, m=1, 2, . . . , M, spatial-separately arranged crossing over the N pairs of driving lines, $\{X_{n-1}, X_{n-2}\}$ along a column direction of the electrode matrix, the column direction being perpendicular to the row direction,
   wherein each odd driving electrode in the n-th row of the electrode matrix is electrically connected to each other by a first driving line $X_{n-1}$ of the n-th paired driving lines $X_{n-1}$ and $X_{n-2}$, and each even driving electrode in the n-th row of the electrode matrix is electrically connected to each other by a second driving line $X_{n-2}$ of the n-th paired driving lines $X_{n-1}$ and $X_{n-2}$; and wherein each sensing electrode in the m-th column of the electrode matrix is electrically connected to each other by a corresponding sensing line $Y_m$.

9. The multi-channel touch panel of claim 8, wherein each of the plurality of sensing electrodes and the corresponding one of the plurality of driving electrodes are electrically insulated from one another.

10. The multi-channel touch panel of claim 8, wherein each of the plurality of sensing electrodes and the corresponding one of the plurality of driving electrodes that surrounds the sensing electrode are spatially separated from one another.

11. The multi-channel touch panel of claim 10, wherein each of the plurality of driving electrodes is formed to have a body portion and a bridge electrically connected the body portion to a corresponding driving line of the N pairs of driving lines, wherein each of the plurality of sensing electrodes is formed to have a body portion and a bridge electrically connected the body portion to a corresponding sensing line Y m.

12. The multi-channel touch panel of claim 11, wherein the body portion of each of the plurality of sensing electrodes has a geometric shape of circle, oval, diamond, square, triangle, or polygon.

13. The multi-channel touch panel of claim 12, wherein each of the plurality of driving electrodes has a concave edge defining a space that is substantially complementary to the geometric shape of the body portion of each sensing electrode.

14. The multi-channel touch panel of claim 8, wherein the plurality of driving electrodes and the plurality of sensing electrodes are formed of a thin layer of one or more conductive materials.

15. A multi-channel touch panel, comprising:
 (a) a plurality of driving electrodes spatial-separately arranged in the form of a matrix;
 (b) a plurality of sensing electrodes associated with the plurality of driving electrodes such that each sensing electrode and a corresponding driving electrode define a sensing capacitor therebetween, wherein the plurality of driving electrodes and the plurality of sensing electrodes define an electrode matrix having N rows and M columns, each of N and M being a positive integer;
 (c) N groups of driving lines, $\{X_{n-j}\}$, n=1, 2, ..., N, j=1, 2, ..., J, and J is a positive integer, spatial-separately arranged along a row direction of the electrode matrix, each group having J driving lines, $X_{n-1}, X_{n-2}, \ldots, X_{n-J}$;
 (d) M groups of sensing lines, $\{Y_{m-k}\}$, m=1, 2, ..., M, k=1, 2, ..., K, and K is a positive integer, spatial-separately arranged crossing over the N groups of driving lines $\{X_{n-j}\}$ along a column direction of the electrode matrix, the column direction being perpendicular to the row direction, each group having K sensing lines, $Y_{m-1}, Y_{m-2}, \ldots, Y_{m-K}$;
 wherein each of j-th, (J+j)-th, (2J+j)-th, (3J+j)-th, ... driving electrodes in the n-th row of the electrode matrix is electrically connected to each other by the j-th driving line $X_{n-j}$ of the n-th group of driving lines $X_{n-1}, X_{n-2}, \ldots, X_{n-J}$; and
 wherein each of k-th, (K+k)-th, (2K+k)-th, (3K+k)-th, ... sensing electrodes in the m-th column of the electrode matrix is electrically connected to each other by the k-th sensing line $Y_{m-k}$ of the m-th group of sensing lines $Y_{m-1}, Y_{m-2}, \ldots, Y_{m-K}$.

16. The multi-channel touch panel of claim 15, wherein each of the plurality of sensing electrodes and the corresponding one of the plurality of driving electrodes are electrically insulated from one another.

17. The multi-channel touch panel of claim 15, wherein each of the plurality of sensing electrodes is surrounded by a corresponding one of the plurality of driving electrodes and wherein the sensing electrode and the corresponding driving electrode are spatially separated from one another.

18. The multi-channel touch panel of claim 15, wherein each of the N group of driving lines $\{X_{n-j}\}$ and each of the M group of sensing lines $\{Y_{m-k}\}$ are electrically insulated from one another.

\* \* \* \* \*